C. NELSON.
LIFTER.
APPLICATION FILED JUNE 17, 1919.
1,353,782.
Patented Sept. 21, 1920.
2 SHEETS—SHEET 1.
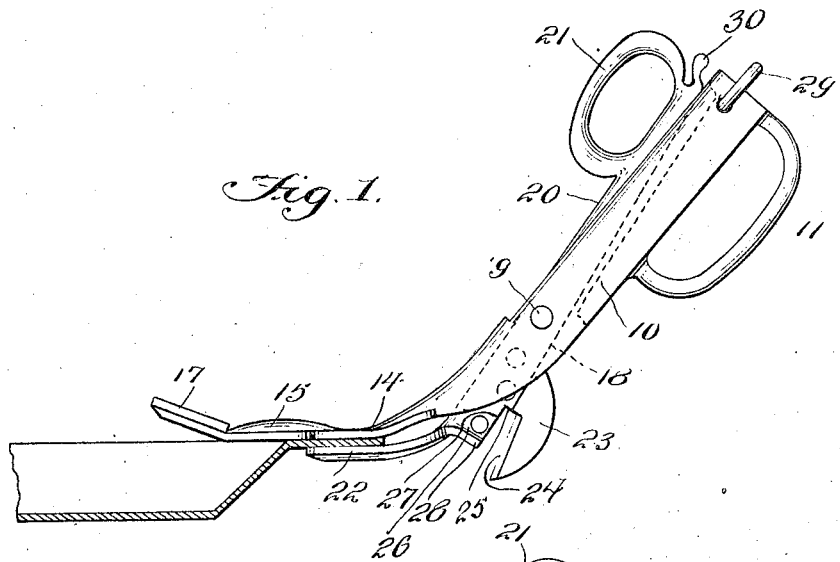
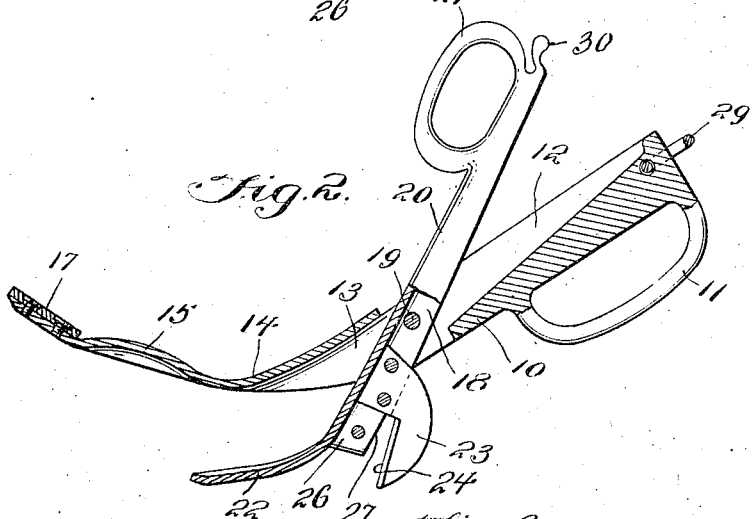
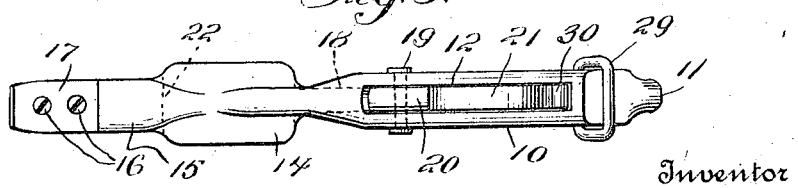
Inventor
Charles Nelson
By Victor J. Evans
Attorney C. NELSON.
LIFTER.
APPLICATION FILED JUNE 17, 1919.
1,353,782.
Patented Sept. 21, 1920.
2 SHEETS—SHEET 2.
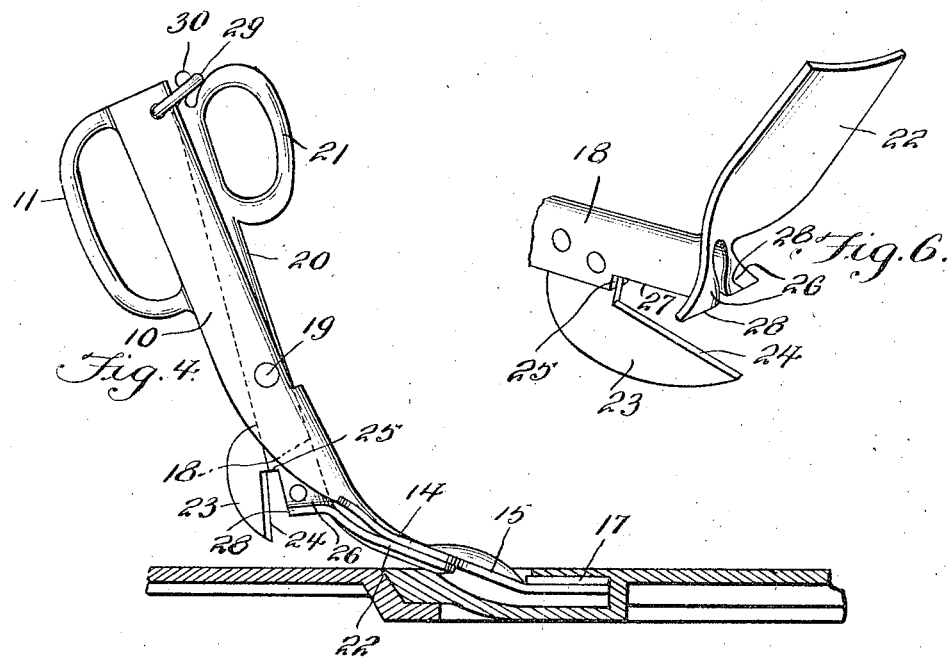
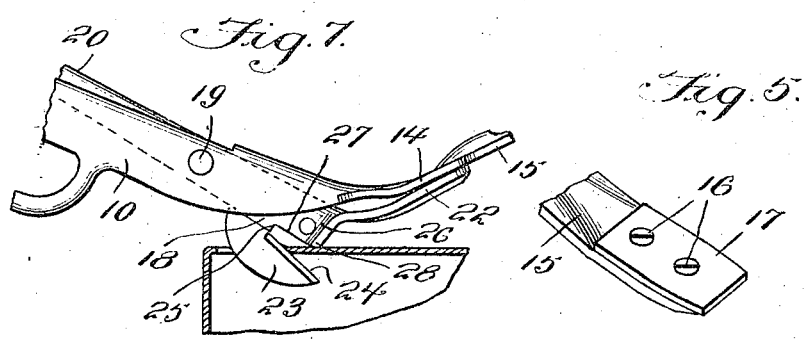
INVENTOR.
BY Charles Nelson
Victor J. Evans
ATTORNEY.

UNITED STATES PATENT OFFICE.

CHARLES NELSON, OF SKYKOMISH, WASHINGTON.

LIFTER.

1,353,782. Specification of Letters Patent. Patented Sept. 21, 1920.

Application filed June 17, 1919. Serial No. 304,861.

*To all whom it may concern:*

Be it known that I, CHARLES NELSON, a citizen of the United States, residing at Skykomish, in the county of King and State of Washington, have invented new and useful Improvements in Lifters, of which the following is a specification.

This invention relates to kitchen articles, particularly to lifters, and has for its object the provision of a device having a scissor action and scissor grip and which is adapted for lifting hot pans or the like, which is also provided with means whereby to lift stove lids, and which furthermore has one movable element constructed as a can opener.

An important object is the provision of a device of this character which will be simple and inexpensive in manufacture, highly efficient and convenient in use, and a general improvement in the art.

With the above and other objects and advantages in view, the invention consists in the details of construction to be hereinafter more fully described and claimed, and illustrated in the accompanying drawings, in which—

Figure 1 is a side elevation of the device in use as a pan lifter,

Fig. 2 is a longitudinal sectional view therethrough showing the gripping jaws in open position, Fig. 3 is an elevation taken at right angles to Fig. 1, Fig. 4 is a side elevation of the device in use as a stove lid lifter, Fig. 5 is a detail view of the stove lid engaging portion, and Fig. 6 is a side elevation of the device showing it in use as a can opener.

Fig. 7 is a detail view showing the device in use as a can opener.

Referring more particularly to the drawings, the numeral 10 designates one member of my device which terminates at one end in a loop 11 constituting half of a scissors grip. The main portion of this member 10 constitutes a handle which is provided along its edge opposite the loop 11 with a longitudinally extending recess 12 which communicates with a slot 13. At its other end, the member 10 is provided with a laterally deflected portion 14 constituting a gripping jaw and this jaw terminates in a reduced extension 15 upon which is detachably secured, by means of screws 16 or the like, a hardened steel plate 17.

Extending through the slot 13 in the member 10 is a member 18 which is pivotally connected with the member 10, as shown at 19, and which has its handle portion 20 adapted to lie within the recess 12. This handle portion 20 terminates in a loop 21 cooperating with the loop 11 for forming a scissor grip. At its other end, the member 18 has formed thereon a laterally deflected portion 22 constituting a gripping jaw adapted for coöperation with the jaw 14 on the member 10.

The member 18 is formed preferably bifurcated and secured within this bifurcation adjacent the pivot 19 is a blade 23 which has a cutting edge 24 extending in spaced relation to a shoulder 25 former on the member 18 near its juncture with the jaw 22, and this portion of the member 18 has the end of each half of the bifurcation flared outwardly, as shown at 26, and recessed, as shown at 27, to provide shoulders 28.

In the use of the device as a can opener, the members 10 and 18 are brought together and are held together by means of a bail 29 pivoted upon the handle of the member 10 and engageable with a catch 30 on the handle of the member 18. When the parts are thus held together, which is done merely for the sake of convenience, the blade 23 may be inserted into a can and the device used as a can opener in the ordinary manner, the recessses 27 and shoulders 28 providing means whereby the device will be prevented from slipping from the can.

In the use of the device as a hot pan lifter, the operator grasps the members 10 and 18 with his thumb and fingers engaging respectively through the loops 11 and 21, whereupon by moving the members 10 and 18 apart the jaws 14 and 22 will be separated so that they will be engaged upon the edge of a pan, whereupon by squeezing the handles together the jaws will grip the pan so that it may be easily lifted. This use of the device is clearly illustrated in the drawings.

When it is desired to use the device as a stove lid lifter, the operator grasps the device in any convenient manner and inserts the reduced extension 15 of the member 18 within the opening in a stove lid, whereupon the lid may be lifted in the ordinary manner. The provision of the steel plate 17 is important as this plate may be easily removed and replaced when worn.

From the foregoing description and a study of the drawings, it will be apparent that I have thus provided a very simple device which is capable of use as a pan lifter, stove lid lifter, and can opener, and which will consequently be a very convenient and labor saving implement.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:—

1. A device of the character described comprising a handle member terminating at one end in a finger engaging loop and provided at said end with a longitudinally extending inclined recess, the other end portion of said handle member being U-shaped in cross section whereby to provide an opening communicating with said recess, the terminal of said second named end portion being inclined and being widened at both sides to provide a jaw, a second member disposed within the U-shaped portion of said first named member and pivoted adjacent the juncture of the U-shaped portion with one end of the recess, said second named member being disposable within said recess and terminating at one end in a finger engaging loop, and the other terminal of said second named member being widened and curved to provide a jaw coöperating with said first named jaw.

2. A device of the character described comprising a handle member formed of sheet material and channel shaped in cross section, said member being formed with a finger engaging loop at one end and having its other end curved and reduced in width to define a relatively flat elongated portion, and a wear plate secured upon said second named end and having its edges flush with the edges thereof, said reduced end carrying the wear plate being insertible within the lifting hole of a stove lid, a portion of the curved end of the member serving as a heel and constituting a fulcrum.

In testimony whereof I affix my signature.

CHARLES NELSON.